Patented July 5, 1927.

1,634,410

UNITED STATES PATENT OFFICE.

ELMER E. ELDREDGE, OF OCONOMOWOC, WISCONSIN, ASSIGNOR TO PABST CORPORATION, OF MILWAUKEE, WISCONSIN, A CORPORATION OF WISCONSIN.

PROCESSED CHEESE AND METHOD OF MAKING THE SAME.

No Drawing.   Application filed July 19, 1924. Serial No. 727,059.

This invention relates to a process of making cheese and the product which is obtained thereby, and has for its object the provision of a process whereby products usually wasted in a cheese factory may be utilized, and whereby the cheese itself produced will be of good body and texture and possess a more appetizing flavor than the usual so-called "processed" cheese.

The invention further consists in the cheese and the process of making the same hereinafter more particularly described and claimed.

Whey contains water, albumen, milk sugar, mineral salts and some fats and casein. In the carrying out of my process I take this whey, usually a waste product of the cheese factory, and neutralize it by the use of caustic soda or other alkaline salts. This neutralized whey is then concentrated, so as to be of pasty consistency when cold, and in such condition may have a moisture content of from 30 to 50%. Such condensation may be effected in any well-known manner but is preferably effected by heating in a vacuum cooking vessel or pan with a vacuum of 27 to 28 inches, which corresponds to a temperature of about 140 degrees Fahrenheit, the concentration preferably being accompanied by stirring of the mixture. The concentrate thus formed as a liquid turns to a paste when cold and this concentrate is mixed, as by stirring, with ground cheese, and stabilized or Pasteurized in any of the well-known ways to form a cheese product having a homogeneous texture which will keep indefinitely, or for long periods, under ordinary climatic temperatures, and is then packaged for market, generally in hermetically-sealed containers or in sealed tin foil coverings in any of the well-known ways.

This concentrate is preferably added to the ground cheese to form a mixture of 90% ground cheese and 10% condensate. The concentrate may be mixed with any kind or variety of ground cheese. The product obtained is an improvement over the usual so-called "processed" cheese, as the taste of the cheese is improved, it is snappier, and has a more palatable flavor than the usual processed cheese.

While the addition of the concentrate to the ground cheese produces a product in which the butter-fat content is lower than that of the ground cheese, it produces a cheese which is richer in mineral salts and albumen. If desired, butter may be added to the mixture of ground cheese and concentrate, before Pasteurization, to increase the butter-fat content to the desired percentage, although the addition of butter-fat is not necessary to make the product more palatable.

Large cheese factories usually have to buy cheese from the smaller producers to mix with the cheese that the factory itself produces, and by the present process I am enabled to utilize the waste whey of the factory in the production of a finished cheese product.

Although cheese has long been known as a food product, it is not as widely used as it should be owing to the difficulty experienced by some persons in its digestion. It is well known that casein coagulates in the presence of the hydrochloric acid in the stomach, and the more flocculent the curd and the more the casein is protected against coagulation the more easily it is digested. I have discovered that the addition of albumen adds to the digestibility of the casein by forming a colloid which gives not only a more flocculent curd but has a tendency to cut the casein and prevent accession thereto of the hydrochloric acid and thus prevent the formation of curds in the stomach, which facilitates the digestion of the casein the duodenum and the intestines where the reactions are alkaline. Other colloids may be used for causing this effect, such as gelatine, but in using these care must be exercised that they are not themselves coagulated as then they do not function as a protective colloid, being no longer in a colloidal state. By my improved process albumen is retained in its original colloidal state, it is not precipitated out of the solution and the protective features are retained even though it be an irreversible colloid.

I desire it to be understood that this invention is not to be limited to specific details except as such limitations are included in the claims or necessitated by the prior art.

What I claim as my invention is:

1. The process of making cheese which consists in neutralizing whey, concentrating the neutralized whey to form a concentrate of pasty consistency when cold, mixing this concentrate with ground cheese and heating the mixture to a Pasteurizing temperature to form a food product of homogeneous texture.

2. The process of making cheese which consists in neutralizing whey with an alkaline salt, concentrating the neutralized whey to form a concentrate having a pasty consistency when cold, mixing this concentrate with ground cheese and heating the mixture to a Pasteurizing temperature to form a food product of homogeneous texture.

3. The process of making a food product which consists in concentrating whey to a moisture content of 30 to 50 per cent, intimately mixing this concentrate with ground, cured cheese and heating the mixture to a Pasteurizing temperature to form a food product of homogeneous texture.

4. As an article of manufacture a new food product consisting of cured cheese and whey concentrate containing a pabulum for aciduric bacteria, the cured cheese being substantially free of putrefactive bacteria and the lactose of the whey being fixed against lactic acid fermentation.

5. As an article of manufacture, a food product consisting of cured cheese and neutralized whey concentrate forming a cheese product of homogeneous texture, the cured cheese being substantially free of putrefactive bacteria and the lactose of the whey being fixed against lactic acid fermentation.

6. As an article of manufacture, a food product consisting of cured cheese and neutralized whey concentrate in substantially the proportion of ninety per cent cheese and ten per cent of whey concentrate forming a cheese product of homogeneous texture, the cured cheese being substantially free of putrefactive bacteria and the lactose of the whey being fixed against lactic acid fermentation.

In testimony whereof, I affix my signature.

ELMER E. ELDREDGE.

to form a food product of homogeneous texture.

2. The process of making cheese which consists in neutralizing whey with an alkaline salt, concentrating the neutralized whey to form a concentrate having a pasty consistency when cold, mixing this concentrate with ground cheese and heating the mixture to a Pasteurizing temperature to form a food product of homogeneous texture.

3. The process of making a food product which consists in concentrating whey to a moisture content of 30 to 50 per cent, intimately mixing this concentrate with ground, cured cheese and heating the mixture to a Pasteurizing temperature to form a food product of homogeneous texture.

4. As an article of manufacture a new food product consisting of cured cheese and whey concentrate containing a pabulum for aciduric bacteria, the cured cheese being substantially free of putrefactive bacteria and the lactose of the whey being fixed against lactic acid fermentation.

5. As an article of manufacture, a food product consisting of cured cheese and neutralized whey concentrate forming a cheese product of homogeneous texture, the cured cheese being substantially free of putrefactive bacteria and the lactose of the whey being fixed against lactic acid fermentation.

6. As an article of manufacture, a food product consisting of cured cheese and neutralized whey concentrate in substantially the proportion of ninety per cent cheese and ten per cent of whey concentrate forming a cheese product of homogeneous texture, the cured cheese being substantially free of putrefactive bacteria and the lactose of the whey being fixed against lactic acid fermentation.

In testimony whereof, I affix my signature.

ELMER E. ELDREDGE.

Certificate of Correction.

Patent No. 1,634,410.     Granted July 5, 1927, to

ELMER E. ELDREDGE.

It is hereby certified that error appears in the printed specification of the above-numbered patent requiring correction as follows: Page 1, line 87, after the word "casein" insert the word *in;* and that the said Letters Patent should be read with this correction therein that the same may conform to the record of the case in the Patent Office.

Signed and sealed this 16th day of August, A. D. 1927.

[SEAL.]
                         M. J. MOORE,
*Acting Commissioner of Patents.*

Certificate of Correction.

Patent No. 1,634,410.  Granted July 5, 1927, to

ELMER E. ELDREDGE.

It is hereby certified that error appears in the printed specification of the above-numbered patent requiring correction as follows: Page 1, line 87, after the word "casein" insert the word *in;* and that the said Letters Patent should be read with this correction therein that the same may conform to the record of the case in the Patent Office.

Signed and sealed this 16th day of August, A. D. 1927.

[SEAL.]

M. J. MOORE,
*Acting Commissioner of Patents.*